(12) United States Patent
Zhang

(10) Patent No.: US 8,435,663 B2
(45) Date of Patent: May 7, 2013

(54) BATTERY EJECTOR AND ELECTRONIC DEVICE USING THE SAME

(75) Inventor: Yu Zhang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 402 days.

(21) Appl. No.: 12/771,192

(22) Filed: Apr. 30, 2010

(65) Prior Publication Data

US 2011/0033740 A1 Feb. 10, 2011

(30) Foreign Application Priority Data

Aug. 4, 2009 (CN) .......................... 2009 1 0305183

(51) Int. Cl.
| | |
|---|---|
| *H01M 2/10* | (2006.01) |
| *H01M 6/00* | (2006.01) |
| *H01M 10/00* | (2006.01) |
| *H01M 6/42* | (2006.01) |
| *H01M 2/00* | (2006.01) |
| *H01M 2/02* | (2006.01) |

(52) U.S. Cl.
USPC ............. 429/100; 429/96; 429/122; 429/149; 429/163; 429/177

(58) Field of Classification Search .................... 429/96, 429/100, 122, 149, 163, 177
See application file for complete search history.

(56) References Cited

U.S. PATENT DOCUMENTS

| 6,093,056 | A | * | 7/2000 | Donauer et al. ............... 439/500 |
|---|---|---|---|---|
| 6,511,770 | B2 | * | 1/2003 | Chang ............................ 429/100 |
| 2005/0046382 | A1 | * | 3/2005 | Chuang et al. ................ 320/107 |
| 2007/0152629 | A1 | * | 7/2007 | Osada ............................ 320/107 |
| 2009/0145945 | A1 | * | 6/2009 | Heinzen ............................ 227/9 |

OTHER PUBLICATIONS

Buttonhole Real Dictionary (Princeton University 2003, New Jersey USA, {http://www.realdictionary.com/?q=buttonhole}).*

* cited by examiner

*Primary Examiner* — Patrick Ryan
*Assistant Examiner* — Aaron Greso
(74) *Attorney, Agent, or Firm* — Altis Law Group, Inc.

(57) ABSTRACT

An electronic device includes a housing having a battery chamber and a battery ejector assembled near the battery chamber. The housing has a front surface, the battery chamber is defined in the front surface for receiving a battery therein. The battery ejector includes an ejecting piece comprising an elastic portion, a hinged portion and a pressing portion. The elastic portion is configured for providing an ejecting force to the battery. The hinged portion is disposed at one end of the elastic portion and hinged to the housing. The pressing portion extends and bends from the hinged portion side of the elastic portion opposite to the elastic portion for operating the battery ejector.

3 Claims, 6 Drawing Sheets

BATTERY EJECTOR AND ELECTRONIC DEVICE USING THE SAME

BACK GROUND

1. Technical Field

The exemplary disclosure generally relates to ejectors, and particularly, to a battery ejector and electronic device using the battery ejector.

2. Description of Related Art

Batteries are widely used in electronic devices, such as personal digital assistants (PDAs), and mobile phones. Conventional batteries are detachably received in the electronic device to ensure the batteries and inner circuits of the electronic devices are protected.

The electronic device typically includes a battery, a housing defining a battery chamber for assembling the battery. A cover detachably assembled to the housing to envelop the battery within the battery accommodating space. The removal of the battery from the accommodating space can sometimes be frustrating for the user as they need to use a great deal of force sometimes at awkward angles.

Therefore, there is room for improvement within the art.

BRIEF DESCRIPTION OF THE DRAWINGS

Many aspects of the battery ejector and electronic device using the same can be better understood with reference to the following drawings. These drawings are not necessarily drawn to scale, the emphasis instead being placed upon clearly illustrating the principles of the present battery ejector and electronic device using the same. Moreover, in the drawings like reference numerals designate corresponding sections throughout the several views.

DETAILED DESCRIPTION

Figure 1:
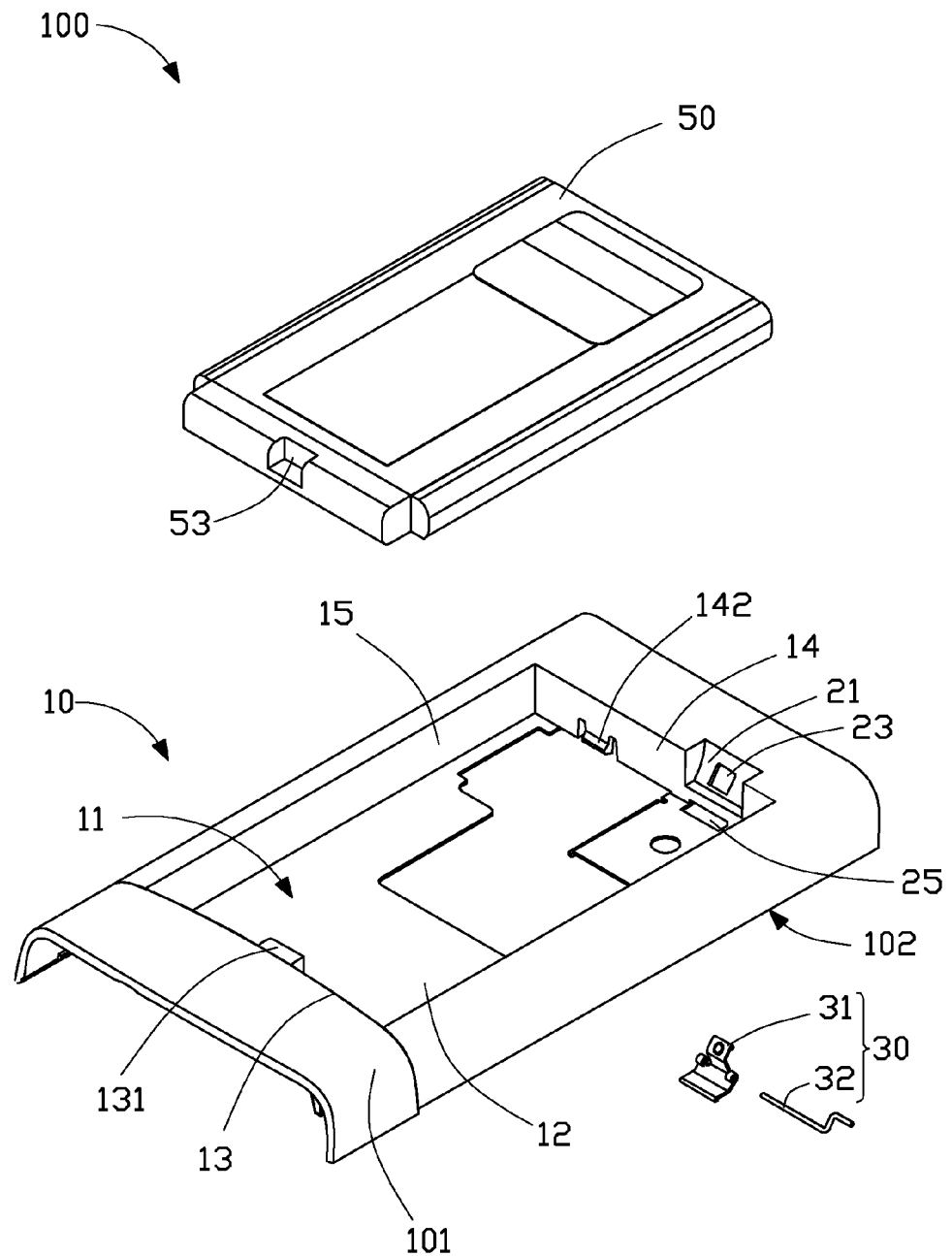
FIG. 1 shows an exploded, perspective view of an electronic device with a battery ejector applied thereto, in accordance with an exemplary embodiment.
Figure 2:
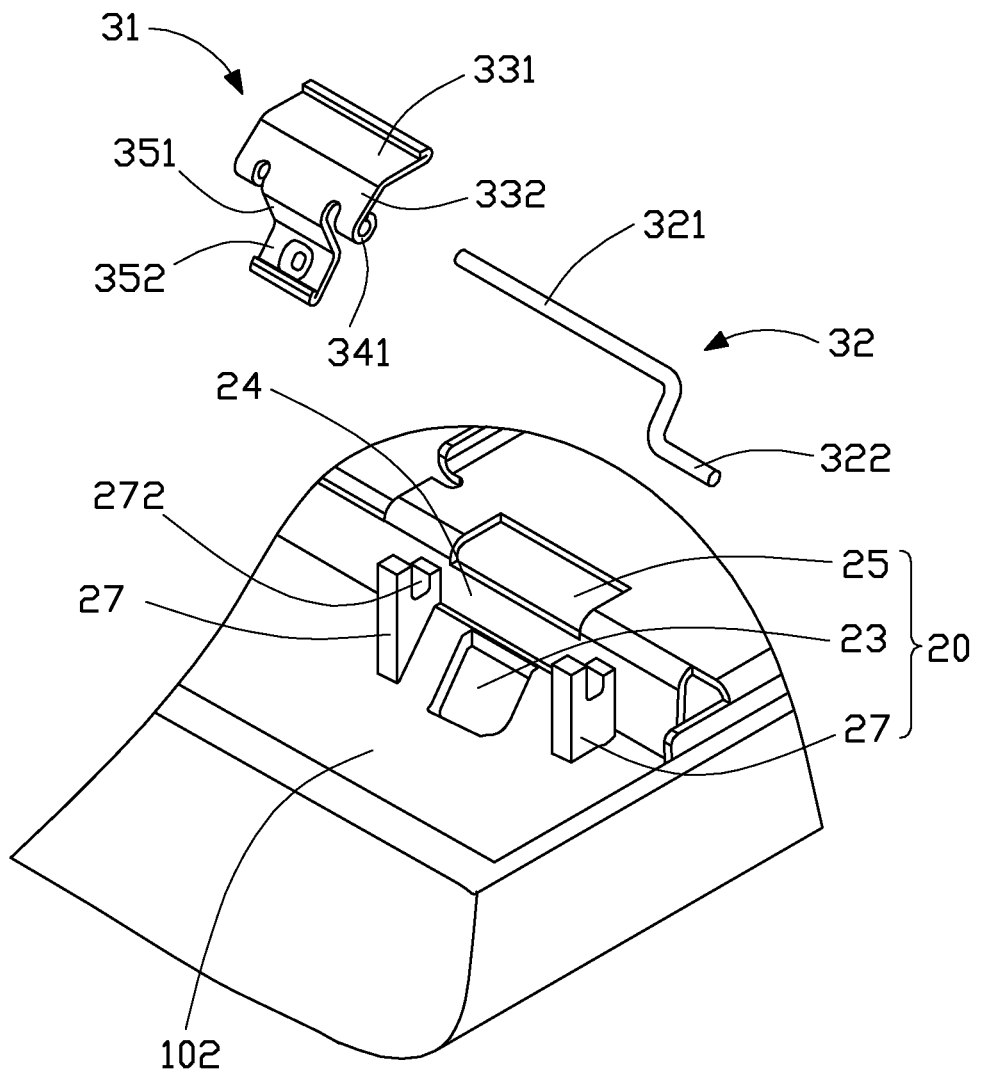
FIG. 2 shows a sectional exploded, perspective view of the electronic device of FIG. 1 from another aspect.

FIG. 1 shows an exemplary electronic device 100 (such as mobile phone, personal digital assistant (PDA), or digital camera.). The electronic device 100 includes a housing 10, a battery ejector 30, and a battery 50. Referring to FIG. 2, the housing 10 may be a main body of the electronic device 100. The housing 10 includes a front surface 101 and a rear surface 102 opposite to the front surface 101. A battery chamber 11 is defined in the front surface 101 of the housing 10 for receiving the battery 50.

The battery chamber 11 includes a base surface 12, a first end surface 13, a second end surface 14 opposite to the first end surface 13, and two opposite side surfaces 15. The base surface 12, the first end surface 13, the second end surface 14 and the two opposite side surfaces 15 cooperatively form the battery chamber 11. The first end surface 13 includes a protrusion 131 protruding from the middle and substantially adjacent to the side of the front surface 101. The second end surface 14 includes an elastic hook 142 formed on the second end surface 14 substantially adjacent to one side surface 15 for elastically resisting the battery 50 assembled within the battery chamber 11. The elastic hook 142 can be integrally formed with the second end surface 14.

An assembling portion 20 is formed on the second end surface 14 of the housing 10 substantially adjacent to the opposite side surface 15 and is configured for assembling and supporting the battery ejector 30. The assembling portion 20 includes an assembling groove 21, a button hole 23, an accommodating slot 25 and two latching blocks 27. The assembling groove 21 is arcuate and recessed from the second end surface 14 spaced from the elastic hook 142 and substantially adjacent to one of the side surfaces 15. The button hole 23 is defined through the bottom of assembling groove 21 to communicate with the rear surface 102 of the housing 10. The accommodating slot 25 is defined through the base surface 12 of the battery chamber 11 substantially adjacent to the assembling groove 21 of the second end surface 14, thereby forming a resisting rib 24 between the button hole 23 and the accommodating slot 25. The two latching blocks 27 protrude outwardly from the rear surface 102 and are located on opposite sides of the button hole 23. Each latching block 27 defines a latching groove 272 at a distal end thereof.

Figure 3:
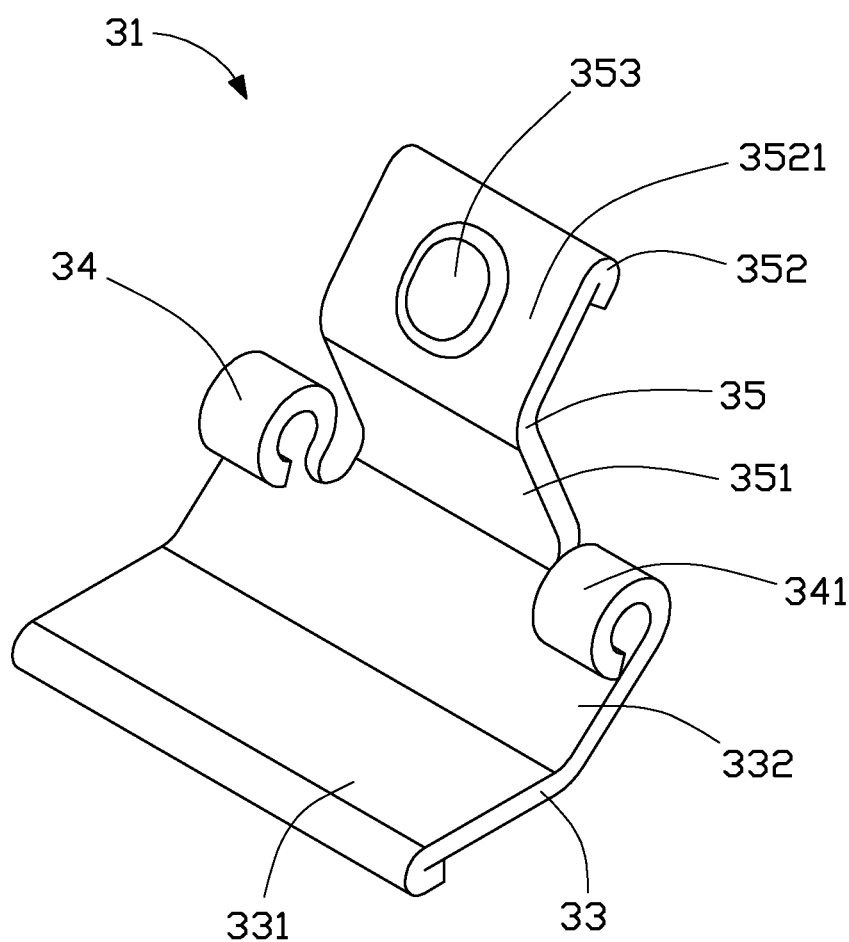
FIG. 3 shows an enlarged perspective view of the ejecting piece of the battery ejector of FIG. 1.

Referring to FIG. 3, the battery ejector 30 is assembled to the assembling portion 20 of the housing 10 and is configured to eject the battery 50 assembled within the battery chamber 11. The battery ejector 30 includes an ejecting piece 31 and a shaft 32. The ejecting piece 31 may be formed from a straight metal sheet. The ejecting piece 31 includes an elastic portion 33, a hinged portion 34 and a pressing portion 35. The elastic portion 33 includes a rectangular elastic arm 331 and a connecting board 332 connecting one end of the elastic arm 331. The hinged portion 34 includes at least one shaft barrel 341 disposed at the distal end of the connecting board 332 opposite to the elastic arm 331. There are two spaced shaft barrels 241 on opposite sides of the distal end of the connecting board 332.

The pressing portion 35 includes a connecting arm 351, a pressing board 352 and a button 353. The connecting arm 351 extends outwardly from the distal end of the connecting board 332 opposite to the elastic arm 331. The connecting arm 351 is located between the two shaft barrels 341. The pressing board 352 extends outwardly from the distal end of the connecting arm 351 opposite to the elastic arm 331. The pressing board 352 includes a pressing surface 3521 at the same side with the two shaft barrels 34 and is configured for assembling within the corresponding button hole 23 of the housing 10. The button 353 protrudes from the middle portion of the pressing surface 3521.

The shaft 32 is made of rubber material and includes a rotatable shaft portion 321 and a fixed end 322. The fixed end 322 is L-shaped connecting one distal end of the rotatable shaft portion 321.

The battery 50 includes a latching slot 53 defined at one distal end thereof corresponding to the protrusion 131 of the first end surface 13 of the housing 10.

Figure 4:
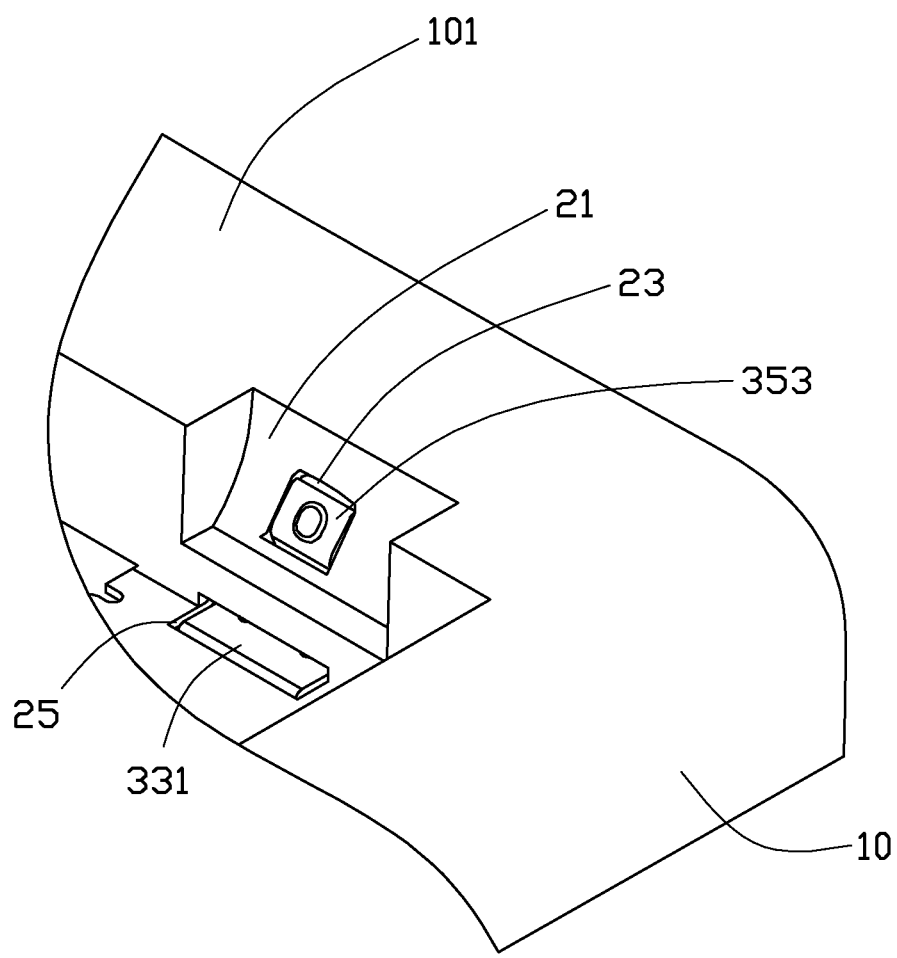
FIG. 4 shows a partial perspective view of the assembled electronic device, wherein, the battery ejector is assembled to the housing of the electronic device.
Figure 5:
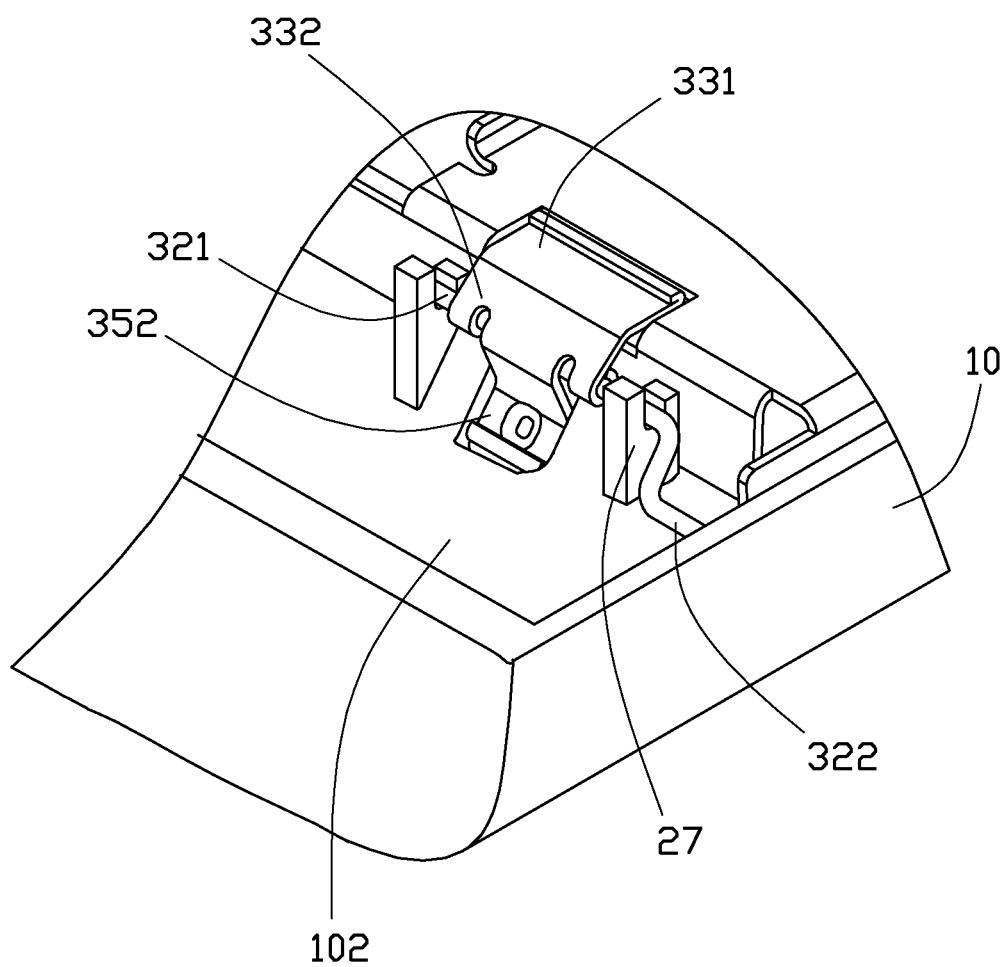
FIG. 5 is similar to FIG. 4, but viewed from another aspect.
Figure 6:
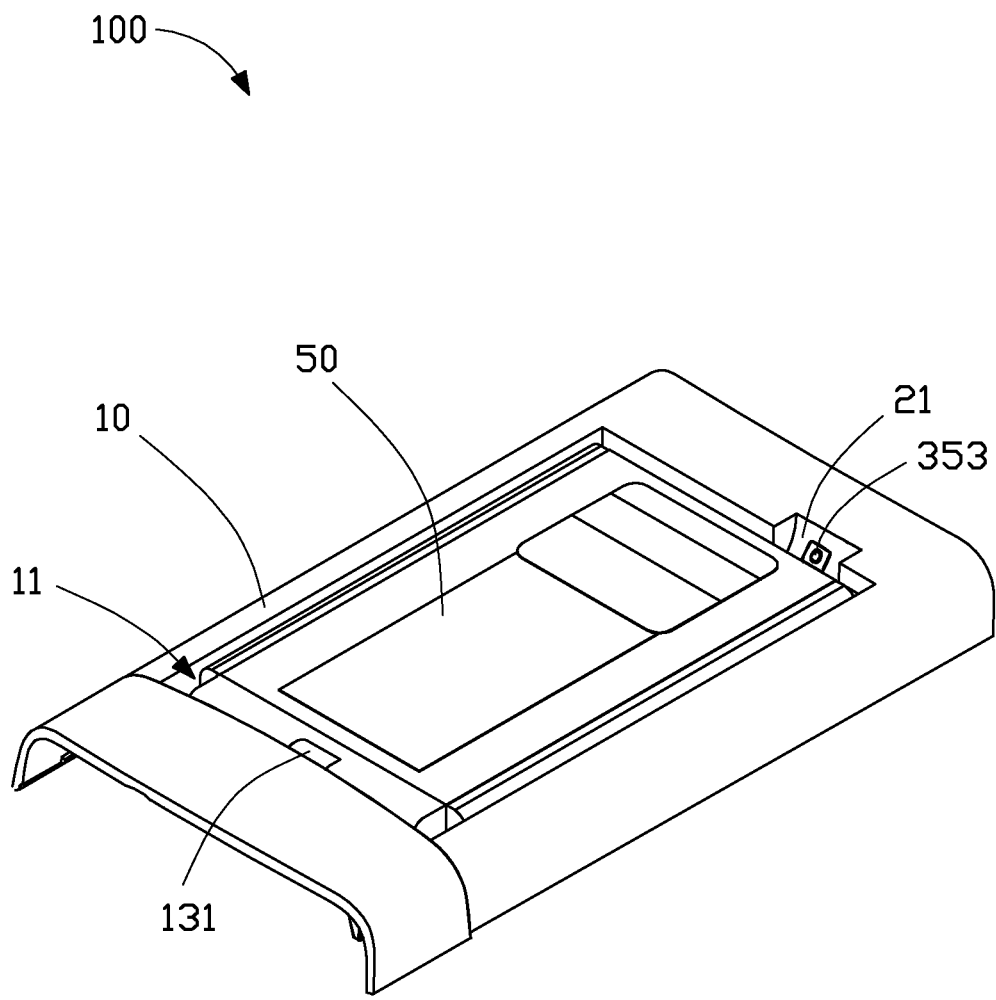
FIG. 6 shows a perspective assembled view of the electronic device of FIG. 1, wherein, a battery is assembled within the housing of the electronic device.

Referring to FIG. 4 and FIG. 5, to assemble the electronic device 100, the shaft portion 321 of the shaft 32 passes through the two shaft barrels 341 of the hinged portion 34 of the ejecting piece 31 and is fixed by welding. The assembled ejector 30 is assembled to and supported by the assembling portion 20 of the housing 10. The two ends of the shaft portion 321 latch into the two latching grooves 272 of the two latching blocks 27 respectively. The fixed end 322 of the shaft 32 is fixed to the rear surface 102 of the housing 10. The elastic arm 331 of the ejecting piece 31 passes through the accommodating slot 25 of the assembling portion 20 and emerges from the base surface 12 of the battery chamber 11 correspondingly. The pressing board 352 resists against the rear surface 102 of the housing 10, and the button 353 passing through the corresponding button hole 23 and emerges from the front surface 101 side of the housing 10. The battery 50 is assembled within the battery chamber 11 of the housing 10, with the latching slot 53 disposed at one distal end and latching with the corresponding protrusion 131 of the first end surface 13 of the battery chamber 11. The opposite end of the battery 50 tightly resists against the elastic hook 142 of the second end surface 14 to prevent the battery 50 from detaching and contacts the elastic arm 331 emerging from the base surface 12 of the accommodating cavity 11. Thus, the battery 50 is tightly assembled within the battery chamber 11.

To detach the battery 50 from the battery chamber 11 of the housing 10. The button 353 is pressed to drive the unit of the hinged portion 34 and the shaft 32 to rotate within the latching grooves 272, accordingly. The elastic arm 331 of the ejecting piece 31 is rotated to eject one end of the battery 50. At this time, the battery 50 can be taken out easily. When releasing the button 353, the pressing board 352 and the elastic arm 331 return to their original positions by the torsion force generated in the pressing process.

It is to be understood, however, that even through numerous characteristics and advantages have been set forth in the foregoing description of embodiments, together with details of the structure and functions of the embodiments, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. An electronic device, comprising:
   a housing having a front surface, an opposite rear surface, and a battery chamber defined in the front surface for receiving a battery therein;
   a battery ejector assembled near the battery chamber of the housing and configured to eject the battery from the battery chamber, the battery ejector comprising an ejecting piece comprising:
      an elastic portion including an elastic arm and a connecting board connected to one end of the elastic arm, the elastic arm configured for providing an ejecting force to the battery;
      a hinged portion extending and bending from a distal end of the connecting board opposite to the elastic arm and hinged to the housing;
      a pressing portion extending and bending from the connecting board opposite to the elastic arm for operating the battery ejector; wherein when the pressing portion is pressed by an external force to drive the hinged portion to rotate, the elastic arm is forced to rotate when configured for ejecting the battery;
   and:
   the battery chamber includes a base surface, a first end surface, an opposite second end surface, and two opposite side surfaces;
   an accommodating slot is defined through the base surface of the battery chamber;
   the elastic arm is assembled within the accommodating slot and emerges from the base surface for ejecting the battery;
   the housing further includes two opposite latching blocks protruding outwardly from the rear surface thereof adjacent to the accommodating slot;
   the hinged portion is hinged to the latching block; wherein:
      the hinged portion includes one shaft barrel extending and bending from the distal end of the connecting board opposite to the elastic arm, each latching block defines a latching groove; the ejector further includes a shaft, the shaft includes a shaft portion and a fixed end bending from one distal end thereof; the shaft portion passing through the shaft barrel of the hinged portion and hinged to the latching groove; the fixed end is fixed to the housing.

2. The electronic device of claim 1, wherein:
   the pressing portion includes a connecting arm connecting with the hinged portion and a pressing board extending from the distal end of the connecting board and bending opposite to the elastic arm, the pressing board includes a button protruding from one surface thereof;
   the housing further includes a button hole defined therethrough, adjacent to the battery chamber; and
   the pressing board abuts against the rear surface of the housing for allowing the button to pass through the button hole and emerge from the front surface side of the housing.

3. The electronic device of claim 1, wherein the housing further includes an elastic hook disposed on one end surface thereof, configured for elastically resisting the battery assembled within the battery chamber.

* * * * *